(12) United States Patent
Maeda

(10) Patent No.: US 6,857,995 B2
(45) Date of Patent: Feb. 22, 2005

(54) TOOL EXCHANGE DEVICE FOR MACHINE TOOL

(75) Inventor: Masahiro Maeda, Yamanashi (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 10/432,086

(22) PCT Filed: Sep. 2, 2002

(86) PCT No.: PCT/JP02/08888

§ 371 (c)(1),
(2), (4) Date: May 20, 2003

(87) PCT Pub. No.: WO03/026839

PCT Pub. Date: Apr. 3, 2003

(65) Prior Publication Data

US 2004/0029691 A1 Feb. 12, 2004

(30) Foreign Application Priority Data

Sep. 21, 2001 (JP) ........................................ 2001-289577

(51) Int. Cl.[7] ............................................. B23Q 03/157
(52) U.S. Cl. ........................................... 483/41; 483/38
(58) Field of Search .............................. 483/40, 41, 48, 483/36, 38, 39, 58, 59, 65, 66, 67

(56) References Cited

U.S. PATENT DOCUMENTS

| | | | |
|---|---|---|---|
| 3,161,951 A | * 12/1964 | Anthony | 483/40 |
| 3,947,951 A | * 4/1976 | Jerue | 483/40 |
| 3,998,338 A | * 12/1976 | Suzuki et al. | 483/41 |
| 4,102,035 A | * 7/1978 | Voglrieder et al. | 483/56 |
| 4,119,213 A | * 10/1978 | Sato et al. | 483/61 |
| 4,399,603 A | * 8/1983 | Reed | 483/41 |
| 4,581,810 A | * 4/1986 | Kawakami et al. | 483/65 |
| 5,704,885 A | * 1/1998 | Lee | 483/62 |
| 6,155,961 A | * 12/2000 | Pollington et al. | 483/59 |
| 6,364,818 B1 | * 4/2002 | Chen | 483/30 |
| 6,371,898 B1 | * 4/2002 | Raiteri | 483/51 |
| 6,428,454 B1 | * 8/2002 | Yokota et al. | 483/68 |

FOREIGN PATENT DOCUMENTS

| | | | |
|---|---|---|---|
| JP | 8-323575 | 12/1986 | |
| JP | 62-193739 | 8/1987 | |
| JP | 62193739 A | * 8/1987 | ......... B23Q/03/157 |
| JP | 63105851 A | * 5/1988 | ......... B23Q/03/157 |
| JP | 63251142 A | * 10/1988 | ......... B23Q/03/157 |
| JP | 1-170532 | 12/1989 | |
| JP | 4-112749 | 9/1992 | |
| JP | 5-85298 | 12/1993 | |
| JP | 05318256 A | * 12/1993 | ......... B23Q/03/157 |
| JP | 08323575 A | * 12/1996 | ......... B23Q/03/157 |
| JP | 11058164 A | * 3/1999 | ......... B23Q/03/157 |
| JP | 2001-71228 | 9/1999 | |
| JP | 2001071228 A | * 3/2001 | ......... B23Q/03/157 |

* cited by examiner

Primary Examiner—Daniel W. Howell
Assistant Examiner—Dana Ross
(74) Attorney, Agent, or Firm—Paul & Paul

(57) ABSTRACT

The invention relates to a tool changer for changing tools between a spindle and a tool magazine of a machine tool. The object of the invention is to provide a simple and compact tool changer. A plurality of tool pots 19 are detachably held by a circular ring tool magazine 21. Once the tool pot 19 receiving a tool to be changed is positioned at a predetermined position 39, the tool pot 19 is rotated 90 degrees to the inside of the tool magazine 21 so that the axis of the tool to be changed is parallel to the spindle 7. The tools are changed through linear motion and rotational motion of a tool changing arm.

5 Claims, 5 Drawing Sheets

TOOL EXCHANGE DEVICE FOR MACHINE TOOL

FIELD OF THE INVENTION

The invention relates to a tool changer for a machine tool, such as a machining center, for automatically changing tools between a spindle of the machine tool and a tool magazine storing a plurality of tools.

BACKGROUND ART

Japanese Unexamined Patent Publication (Kokai) No. 8-323575 describes an automatic tool changer, as a first prior art, which is generally used for machine tools such as machining centers. The tool changer comprises a tool magazine, disposed at one side of a column of the machine tool, for accommodating a plurality of tool pots, each of which receives a tool and moving the tool pots along an orbit to a predetermined position, and a tool changing arm for gripping the tool received in the tool pot positioned at the predetermined position and removing the tool from the tool pot with one of the grippers thereof. The tool changing arm rotates to the outside of the orbit so as to hold a tool received in the spindle with the other gripper and to change the new and old tools with each other. There is another type of tool changer in which the tool changing arm does not rotate 90 degrees but a separately provided sub-arm rotates 90 degrees to move the tool pot to a changing position from the tool magazine. Thereafter, the tool changing arm changes the tool on the spindle. In either type of the tool changers, the tools or the tool pots to be changed is rotated 90 degrees to the outside of the orbit.

Japanese Examined Patent Publication (Kokai) No. 5-85298 describes an automatic tool changer as a second prior art. A circular ring tool magazine has a plurality of tool pots and is rotationally supported at one side of a column. A tool changing arm conducts various motions for changing the tool on the spindle. The tool changing motion is composed of respective motions for holding a tool accommodated in the tool magazine, removing the tool from the tool pot and rotating the tool changing arm 90 degrees. A mechanism for conducting such various motions of the tool changing arm is provided adjacent the tool magazine.

Japanese Unexamined Patent Publication (Kokai) No. 2001-71228 describes an automatic tool changer as a third prior art. A circular tool magazine receives radially disposed tools in a plane with the tips of the tool oriented the center of the circle. The tool magazine is disposed on the ceiling of a splashguard enclosing the machining area. The tool to be changed is lowered from the tool magazine to a changing position where a tool changing arm changes the tool with one on the spindle.

According to the first prior art, the tool or the tool pot is rotated 90 degrees to the outside of the orbit of the tool magazine. Therefore, an extra space for allowing the tool changing motion is necessary at the outside of the tool magazine. This is a problem for spacesaving.

According to the second prior art, the problem of the first prior art is solved. However, as described above, the tool changing arm must conduct various motions. Therefore, there are problems that the configuration of the tool changing arm becomes complex and its size is increased.

According to the third prior art, the problems of the first and second prior art are solved. However, because of the radial disposition of the tools in a plane, the number of the tools stored in the tool magazine is reduced compared with a tool magazine which has the same diameter and accommodates the tools disposed perpendicular to the disk.

The invention is directed to solving the above-describe problems of the prior art, and the object of the invention is to provide a simple and compact tool changer for a machine tool, the tool changer changing tools between an indexable tool magazine having a plurality of tool pots for receiving tools and a spindle.

SUMMARY OF THE INVENTION

In order to achieve the above object, according to the invention, a tool magazine which rotates and indexes tool pots is provided, the tool pot to be changed being rotated to the inside of the tool magazine, the rotated tool pot being disposed parallel to the axis of a tool on a spindle, a tool changing arm changing the tool on the rotated tool pot and the tool on the spindle with each other.

According to the invention, an apparatus for changing a tool between a spindle and a tool magazine of a machine tool, characterized by comprising a tool magazine for storing a plurality of tool pots, each of which receives a tool, the tool magazine moving and indexing the tool pot along an orbit; tool pot rotating means for rotating one of the tool pots, which is positioned at a predetermined position, to the inside from the tool magazine so that the axis of the tool pot is parallel to the spindle; and a tool changing arm for changing tools between the rotated tool pot and the spindle positioned at a tool changing position.

The tool magazine comprises a circular ring member for detachably holding the plurality of tool pots along the inner circumference thereof, a plurality of rollers for rotationally supporting the outer surface of the circular ring member and an actuator, connected to the circular ring member, for rotating the circular ring member to index it.

The above-described configuration of the invention allows the space inside the orbit of the tool pots of the tool magazine to be used for the tool changing motions. Further, only the rotating motion of the tool pot allows the axis of the tool to be parallel to the spindle, and a known double-gripper type tool changing arm can change the new and old tools. Therefore, a tool changer of which mechanism is simple and compact can be realized.

Therefore, a simple and compact tool changer is realized with a configuration of a mechanism for holding a tool pot and rotating it to the inside of the orbit and a known tool changing arm. The tool magazine can be disposed at a forward portion of a machine tool compared with the prior art, and therefore, the space conventionally occupied by the tool magazine can be used for the accommodation of the peripheral devices to reduce the space for the installation of the machine tool.

BRIEF DESCRIPTION OF THE DRAWINGS

The preferred embodiment of the invention will be described below with reference to the drawings, in which.

THE MOST PREFERRED EMBODIMENT

Figure 1:
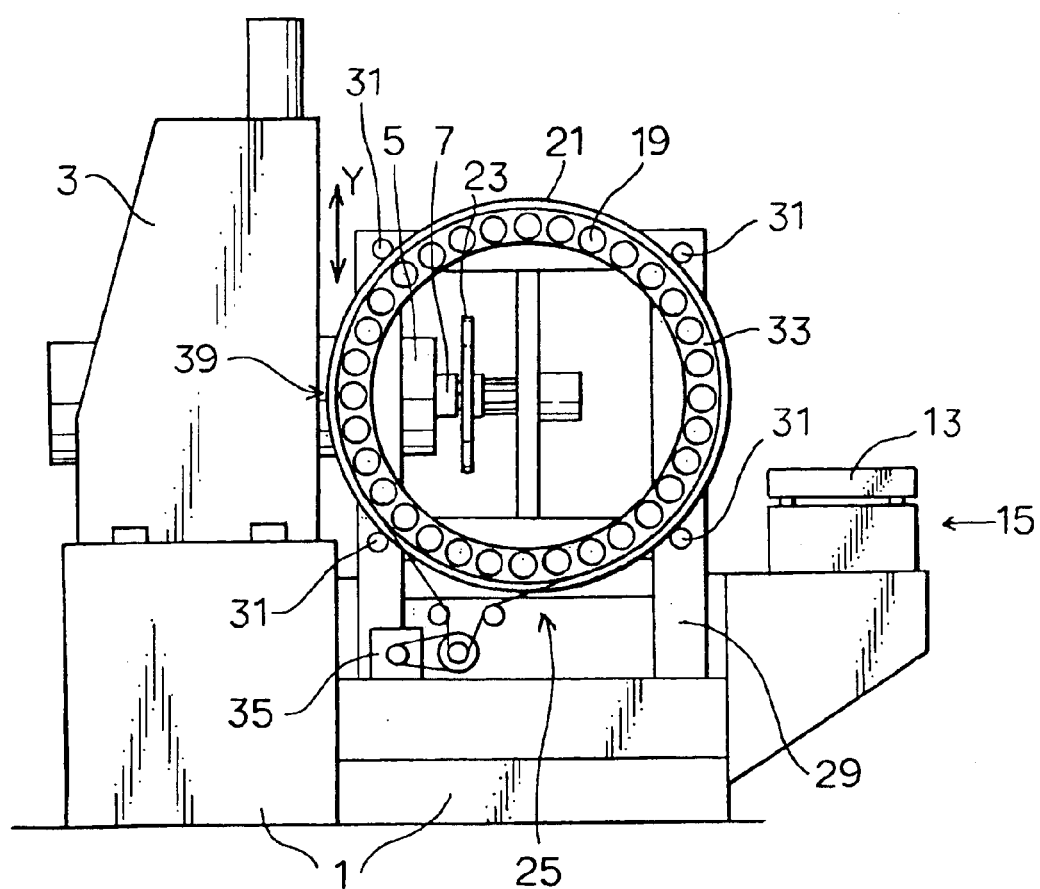
FIG. 1 is a side view of a machine tool having a tool changer of the invention.

A machine tool is comprised of a bed 1, a column 3 mounted on the rear portion of the bed 1 for left-and-right liner motion in the direction of X-axis, a spindle head 5 mounted to the column for up-and-down linear motion in the direction of Y-axis, a spindle 7 rotationally provided in the spindle head 5 for receiving a tool at the end thereof, a table 9 mounted on the front portion of the bed 1 for back-and-forth linear motion in the direction of Z-axis, that is the axial direction of the spindle 7, a pallet 11 detachably mounted on the table 9, a pallet changer 15 which is mounted on the frontal portion of the bed 1 holds a pallet 13 for the replacement with the pallet 11 with a pallet changing arm (not shown) rotating in a horizontal plane, a tool change 25 with a magazine 21 which is disposed at the left side face of the bed 1 and has a plurality of tool 10 pots 19 for receiving tools 17 and a tool changing arm 23 for changing the tool mounted to the spindle 7 with one of the tools 17 mounted to the tool magazine.

The machine tool processes a workpiece, which is mounted on the pallet 11, through a relative motion in X-, Y- and Z-axes between the workpiece and the tool, mounted to the spindle 7, with the tool changer 25 appropriately changing the tools. Once the process on the workpiece is completed, the pallet 13, on which a new workpiece is mounted, is put on the table 9 by the pallet changer 15 for the subsequent process.

Next, the tool changer 25 will be described in detail. A frame 29 is mounted to the left side face of the bed 1. Four rollers 31 are provided on the frame for rotationally supporting a circular ring magazine body 33. The magazine body 33 is connected to an actuator such as a motor 35 through an appropriate means such as a belt, chain or a gear train so as to index a tool.

A plurality of tool pot retainers 37, each of which is comprised of leaf springs, are disposed along the internal circumference of the circular magazine body 33 for holding tool pots 19. The tool pots 19 detachably receive tools 17 with known retaining means (not shown).

The tool pot 19 indexed to a predetermined position 39 is clamped by a cylinder device 41 provided on the frame 29. Another cylinder device 45 rotates the cylinder device 41 along with the tool pot 90 degrees about a rotation axis 43 to the inside of the magazine 21 so that the tool pot 19 is removed from the tool pot retainer 37 of leaf springs. The tool pot is positioned by contacting with a rest 47 provided inside of the tool magazine 21. At that time, the axis of the tool 17 held by the tool pot 19 is parallel to the spindle 7.

Figure 3:
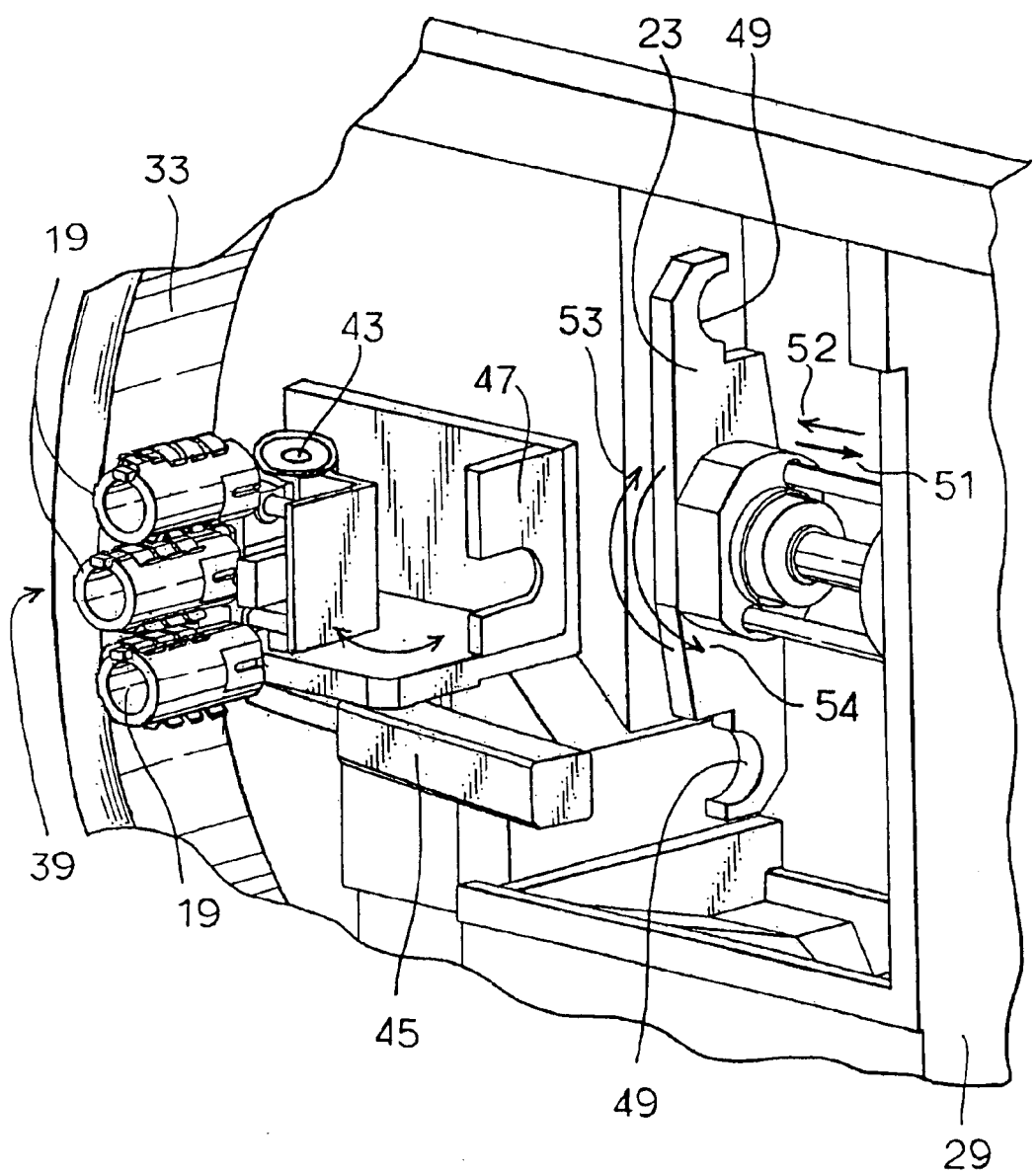
FIG. 3 is a partial perspective view of a main part of the tool changer of the invention.
Figure 4:
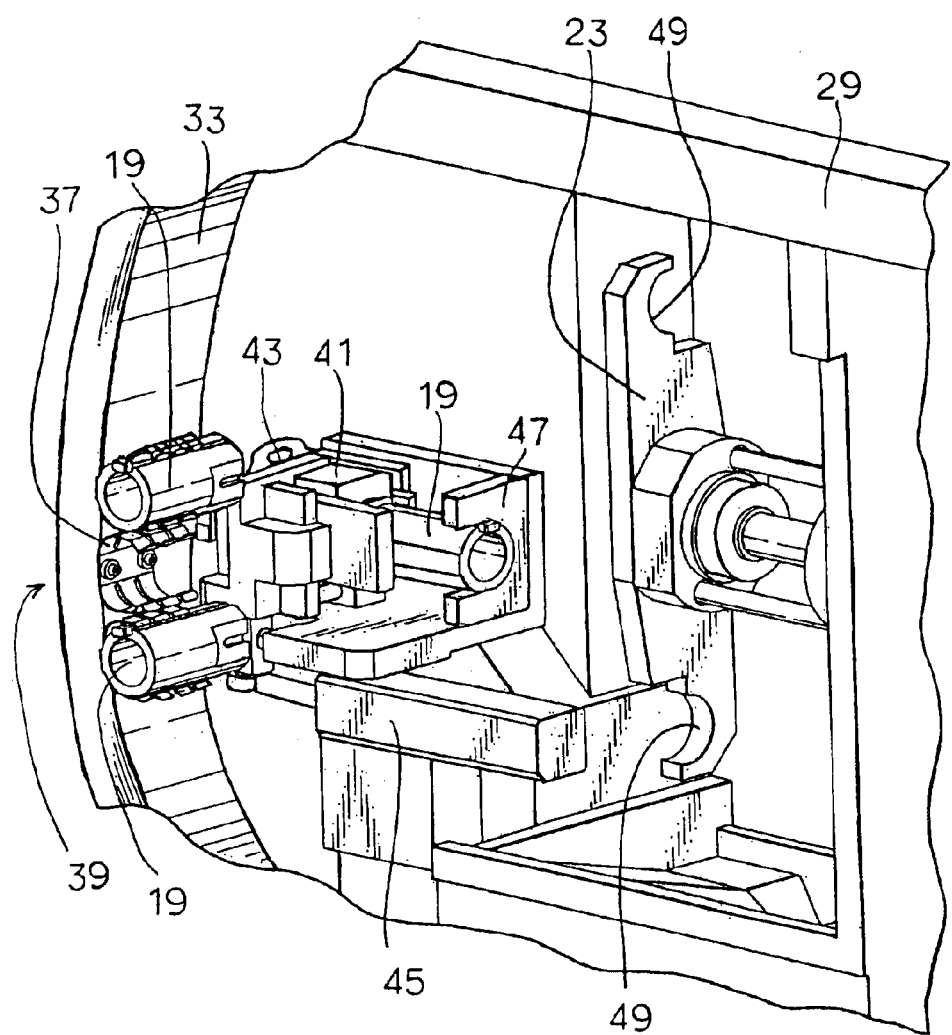
FIG. 4 is a partial perspective view of a tool pot rotated to a position from a tool magazine body.
Figure 5:
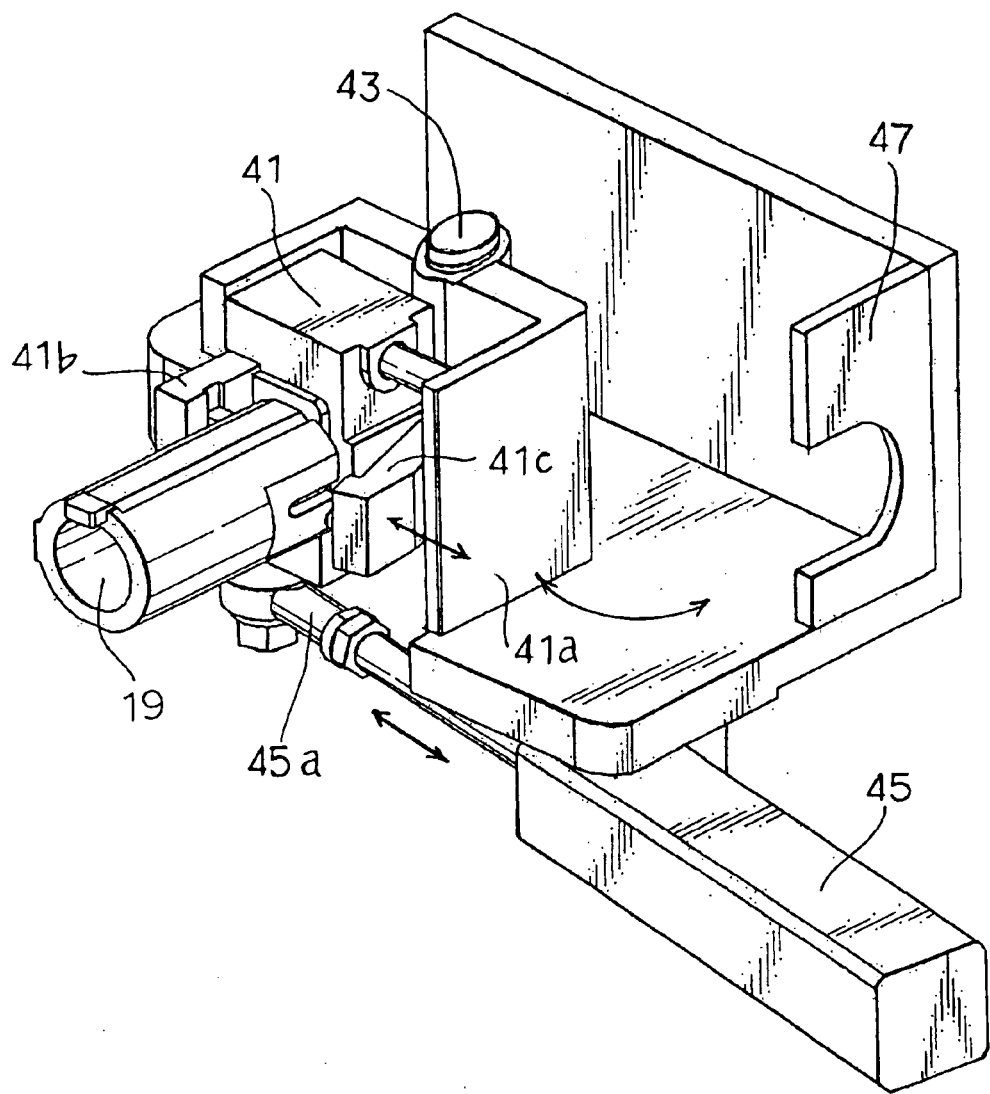
FIG. 5 is a perspective view of tool pot rotating means.

The cylinder device 41 moves, as shown in FIG. 5, a movable member 41a, connected to a piston, to clamp the tool pot 19 with clamping members 41b and 41c. By using appropriate means, such as an engagement between a key and a key groove, the tool pot 19 is always clamped firmly at the correct position. The cylinder device 45 has a piston rod 45a the end of which is connected to the bottom portion of the cylinder device 41 and the contracting motion of the piston rod 45a into the cylinder device 45 rotates the cylinder device 41 90 degrees about a rotation axis 43, the cylinder device 41 clamping the tool pot 19. In particular, the cylinder device 41 rotates between a first delivery position, shown in FIG. 3, at which the tool 17 is delivered relative to the tool magazine 21, and a second delivery position, shown in FIG. 5, at which the tool 17 is delivered relative to the tool changing arm 23.

On the other hand, the tool changing arm 23 is provided on the frame 29 for changing the tool 17 received by the tool pot 19 which is positioned at the rest 47 with the tool mounted to the spindle 7 which is positioned at a tool changing position. The tool changing arm 23 has grippers 49 at each end thereof. The tool changing arm can linearly move in the directions indicated by arrows 51 and 52 in FIG. 3 (the axial direction of the spindle 7) and rotates 90 or 180 degrees in the directions indicated by arrows 53 and 54 (in the plane perpendicular to the axis of the spindle 7). This can be carried out by a known mechanism with a cam or a cylinder device, and therefore, the detailed description thereof is omitted. The tool changing arm 23 is normally at a position shown in the drawings at which the two grippers 49 are vertically positioned. When a tool changing signal is delivered, the tool changing arm 23 rotates 90 degrees in the direction indicated by the arrow 53 (refer to FIG. 3) so that the downside gripper 49 holds the tool 17 received by the tool pot 19 which is positioned at the rest 47 and, at the same time, the topside gripper 49 holds the tool mounted to the spindle 7.

Next, the operation of the tool changing apparatus will be described. The tool pots 19 of the tool magazine 21 receive necessary tools, and the spindle 7 receives a tool which is used at the start of the process. The pot 19 receiving a tool for the subsequent process is moved to the predetermined position 39. This tool pot 19 is positioned at the rest 47 through the rotation of 90 degrees by the cylinder devices 41 and 45 and wait. When a tool changing signal is delivered, the tool changing arm 23 rotates 90 degrees so that the grippers 49 hold the new tool received by the tool pot 19 waiting at the rest 47 and old tool mounted to the spindle 7 at once. Next, the tool changing arm 23 advances in the direction indicated by the arrow 51 to remove the tool 17 from the tool pot 19 and the tool from the spindle 7 at once. Then, the tool changing arm 23 rotates in the direction indicated by the arrow 53 by 180 degrees and retract in the direction indicated by the arrow 52 so that the new tool is mounted to the spindle 7 and the old tool is received by the tool pot 19 at once. The tool changing arm 23 rotates in the direction indicated by the arrow 54. The cylinder devices 41 and 45 rotates 90 degrees to force the tool pot 19 into the blank tool pot retainer 39. The tool pot 19 is held by the leaf springs. After the cylinder device 41 releases the clamped tool pot 19, the motor 35 rotate to move the tool pot 19, receiving the tool for the subsequent process, to the predetermined position 39. Thereafter, the tool changing process will be executed through the above-described sequence.

Figure 2:
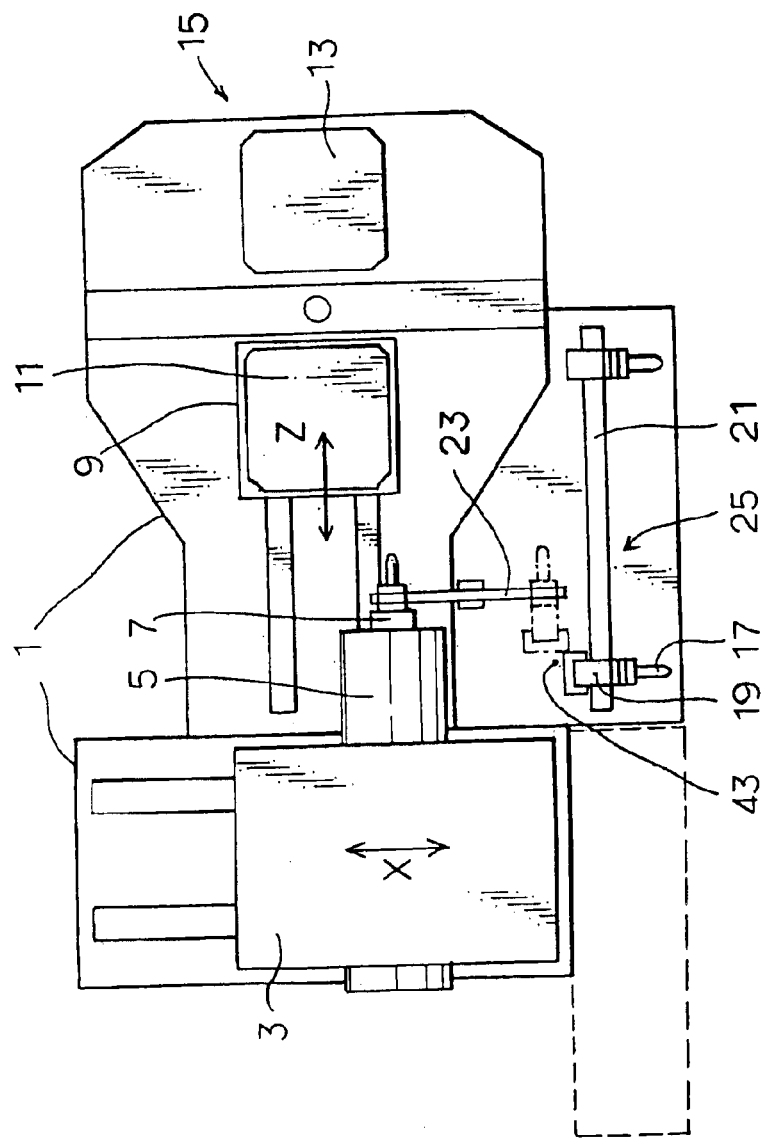
FIG. 2 is a plan view of the machine tool of FIG. 1.

The above-described configuration for rotating the tool pot 19 to the inside of the tool magazine 21 allows the tool magazine to be disposed at a forward position compared with the position of the tool magazine of the first prior art (the position shown by the broken line in FIG. 2). Therefore, peripheral devices, such as a hydraulic unit and an oil temperature controller, necessary for the machine tool can be disposed at the position (the position shown by the broken line in FIG. 2) where the tool magazine of the prior art is disposed. Therefore, the footprint of the whole of the machine tool can be reduced. The peripheral devices, such as a hydraulic unit and an oil temperature controller, have not been disposed at the frontal position where the tool magazine of the present application is located because of the appearance of the machine tool.

In the embodiment, an example of the circular ring tool magazine has been described. However, the present invention can employ a tool magazine in the form of ellipse or a polygon with a circular corners which goes around its perimeter. Further, the present invention can be applied to vertical machine tools instead of the horizontal machine tool. In such a case, the predetermined position is set to the top of the tool magazine, the tool pot at the predetermined position is moved to inside of the tool magazine so that the axis of the tool is parallel to that of the vertical spindle. The tool changing arm is required to vertically move and rotate in a horizontal plane.

What is claimed is:

1. An apparatus for changing a tool between a spindle and a tool magazine of a machine tool, characterized by comprising:

a tool magazine including a circular ring for detachably storing a plurality of tool pots, each of which receives a tool, the tool magazine moving and indexing the tool pots at a predetermined position along an orbit;

tool pot rotating means for detaching one of the tool pots, which is positioned at the predetermined position, from the tool magazine and rotating it to the inside of the tool magazine so that the axis of the tool pot is parallel to the spindle; and a tool changing arm for changing tools between the rotated tool pot and the spindle positioned at a tool changing position.

2. An apparatus for changing tools of a machine tool according to claim 1, wherein the tool magazine comprises a circular ring member for detachably holding the plurality of tool pots along an inner circumference thereof, a plurality of rollers for rotationally supporting the outer surface of the circular ring member and an actuator, connected to the circular ring member, for rotating the circular ring member to index it.

3. An apparatus for changing tools of a machine tool according to claim 2, wherein the tool magazine further comprises pot holding means including leaf springs, disposed along the inner circumference of the circular ring member, for engaging the outer surface of the tool pots to hold them.

4. An apparatus for changing tools of a machine tool according to claim 1, wherein the tool pot rotating means comprises a clamping member for clamping the tool pot positioned at the predetermined position, a first cylinder device for moving the clamping member between a closed position where the clamping member clamps the tool pot and an open position where the clamping member releases the tool pot and a second cylinder device for rotating the clamping member about a vertical axis between a first delivery position where the tool is delivered relative to the tool magazine and a second delivery position where the tool is delivered relative to the tool changing arm.

5. An apparatus for changing tools of a machine tool according to claim 4, wherein the tool pot rotating means comprises a stop member, provided at the second delivery position, for stopping the rotating movement of the clamping member.

* * * * *